July 11, 1967 S. RUCKY 3,330,498
GARDEN HOSE HOLDER
Filed Dec. 15, 1964

INVENTOR.
SAMUEL RUCKY
BY Eugene M. Ebelman
ATTORNEY

United States Patent Office 3,330,498
Patented July 11, 1967

3,330,498
GARDEN HOSE HOLDER
Samuel Rucky, 3332 Willow Pass Road,
Concord, Calif. 94520
Filed Dec. 15, 1964, Ser. No. 418,405
1 Claim. (Cl. 242—86)

This invention relates to new and useful improvements in a holder for garden hose.

An important object of the present invention is to provide a holder of the type described employing novel structure facilitating convenient connection of the female end of a hose for winding the latter on the reel.

Another object is to provide a holder of the type described which in one embodiment has a novel support stand capable of serving as a carrying handle for the holder, and which in another embodiment employs a handle for wheeling the same.

Still another object is to provide a holder for garden hose which is simplified in construction and inexpensive to manufacture.

Additional objects will become apparent from the following specification and claims, considered together with the accompanying drawings, wherein the numerals of reference indicate like parts:

Figure 2:
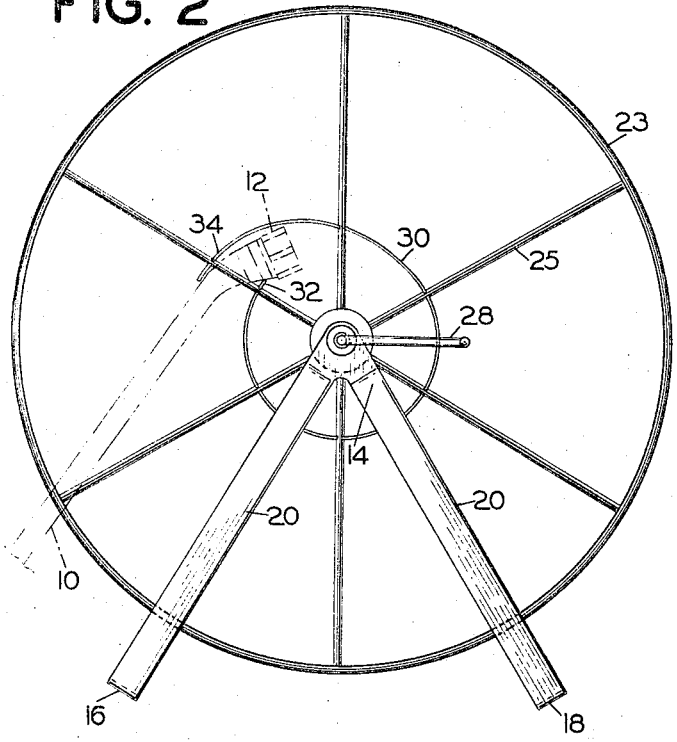
FIGURE 2 is an enlarged side elevational view of the embodiment of FIGURE 1.
Figure 3:
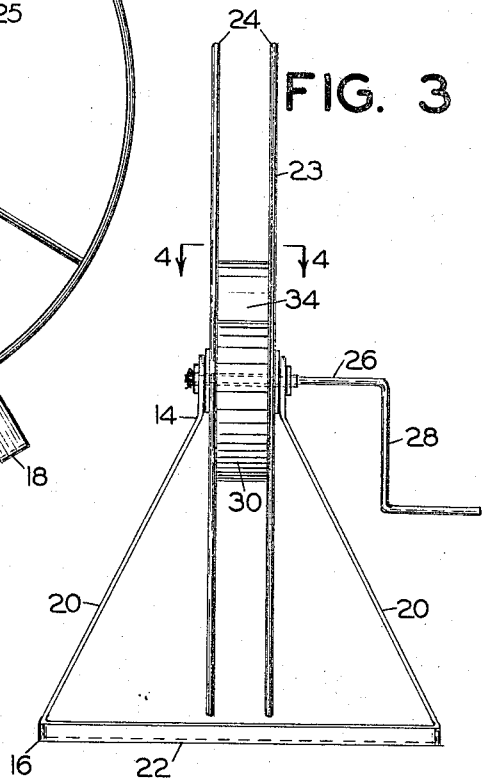
FIGURE 3 is an end elevational view thereof.

Referring in particular to the drawings, the present device was designed to store a garden hose 10 of coventional type. Such hose construction includes a female fitting 12, FIGURE 2, at one end for connection to a pressure source of water such as to a water faucet or a hose leading therefrom. The present device was designed particularly for carrying the conventional sprinkler or soaker hose which has a relatively wide, flat cross section and which has a plurality of perforations therein for slowly exuding water for soaking purposes. Such hoses are constructed of a flexible material such as plastic, rubber, canvas, or the like.

Figure 1:
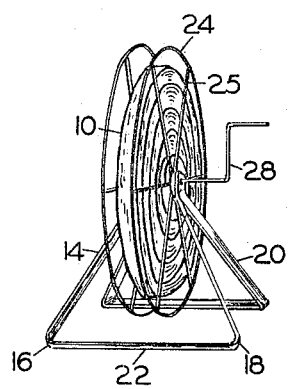
FIGURE 1 is a perspective view of a first embodiment of the present holder.

The present holder in its embodiment of FIGURE 1 comprises a stand 14 having a pair of leg members 16 and 18 angled longitudinally outwardly in an inverted V-shape. These leg members are joined together at their upper ends, and each comprises a pair of bars 20 angled laterally outwardly in opposite directions and connected together at the bottom by a cross bar or foot member 22.

The angled disposition of the leg members 16 and 18 as well as the angled disposition of the side bars 20 facilitates sturdy support of the holder on the ground and permits unwinding of the hose without the possibility of the stand tipping over. Furthermore, as seen in the drawings, the cross bars 22 are perpendicular to the longitudinal line of side bars 20. Thus, bars 22 are angled relative to the ground and serve to securely anchor the holder.

The hose supporting portion 23 or reel of the device comprises a pair of wheels 24 spaced apart a distance slightly greater than the width of the hose. Wheels 24 have spokes 25 and are keyed or otherwise secured on a shaft 26 journaled in the upper portions of the leg members 16 and 18. Shaft 26 extends outwardly on one side of the device and has a crank portion 28. The reel is rotated by operation of the crank 28.

Figure 4:
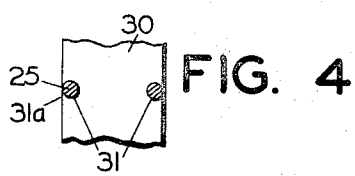
FIGURE 4 is an enlarged fragmentary sectional view taken on the line 4—4 of FIGURE 3.

Secured between the wheels 24 of the reel adjacent the center of the latter is a winding drum 30 having connecting means for receiving an end of the hose 10. Winding drum 30, for its connection to the reel 23, is provided with recesses or openings 31 on each side edge, FIGURE 4, to receive the spokes 25. These recesses are deep enough to receive the spokes and then to be peened or otherwise closed over the outer surfaces of the latter, as illustrated by the numeral 31a for providing an integral connection. The hose connecting means of the drum 30 is formed by the ends 32 and 34 of said drum. These ends terminate at and are anchored on the same pair of laterally disposed spokes, namely, in substantially radial alignment, the end 34 being spaced radially outwardly from the end 32 to provide an opening for receiving and holding one end of the hose. The ends 32 and 34 are spaced to provide a radially extended opening of approximately one and one-half inches which is coextensive with a surface of the drum to receive an end of the conventional soaker hose, although it is to be understood that any size opening may be used for correspondingly dimensioned hose fittings. Either end of the hose may be inserted in the opening, depending upon which end the operator desires to have on the outside of the coil. To wind up the hose, a desired end thereof is inserted in the opening a distance sufficient that upon rotation of the reel by means of the crank 28 in a clockwise direction, FIGURE 2, the inner end binds itself in the opening and draws the hose onto the reel. When unwinding the hose, the inner end is adapted to slip freely from the opening at the completion of said unwinding.

In operation of the device, the hose is wound on the drum in the manner just described, and when it is desired to use the hose 10 the present reel is carried to the area to be watered and the hose pulled endwise off the reel. The inner end of the hose drops freely from the reel and connection of the female end is made to the male end of a garden hose leading from a source of water supply.

There is thus provided a holder for hose which facilitates easy connection of the hose thereto and easy winding, and furthermore provides a device which is stable when the hose is being wound or unwound. Furthermore, in carrying the device it may be inverted if desired and one of the cross bars or foot members 22 is adapted to serve as a carrying handle.

Figure 5:
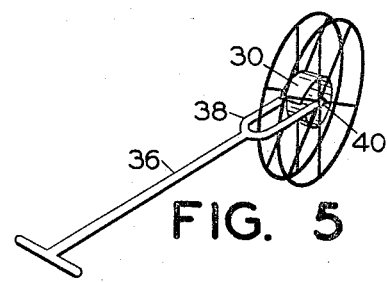
FIGURE 5 is a perspective view of a second embodiment of the holder.

With reference to FIGURE 5, which shows a second embodiment of the invention, the stand 14 and crank 28 are not included. Instead, this structure has a handle member 36 provided with a yoke 38 the arms of which extend on opposite sides of the reel 23 and receive the ends of a reel shaft 40. The reel structure and drum 30 are the same as in the FIGURE 1 embodiment.

To reel up the hose, the desired end thereof is inserted in the opening between the ends 32 and 34 of the drum and the reel then wheeled along to pick up the hose which is lying on the ground, the hose being maintained between the rims of the reel as the latter is wheeled. A reverse procedure is followed in unwinding the hose in that the outer end of the hose is dropped to the ground at the desired placement of the reel and the latter then wheeled along the desired path.

It is to be understood that the forms of my invention herein shown and described are to be taken as preferred examples of the same and that various changes in the shape, size and arrangement of parts may be resorted to without departing from the spirit of my invention or the scope of the subjoined claim.

Having thus described my invention, I claim:

In combination a flexible lawn sprinkling hose having an end coupling enlarged relative to the hose, and a holder for said hose, said holder comprising a reel having a pair of concentric wheels disposed in spaced, parallel relation and having a plurality of radial spokes, a drum of less diameter than said wheels secured therebetween, said drum including a plate member of a surface shape receiving the hose thereon in wrapped relation, said drum having a pair of disconnected coupling engaging end portions terminating in end edges disposed substantially in radial alignment and secured adjacent their ends to a common one of said spokes, one of said end portions being spaced radially outwardly from the other end portion to form an opening therebetween, coextensive with a surface portion of the drum, said opening receiving an end of said hose with said end coupling of the latter projected through said opening and hooked behind one of the edges of said end portions of said drum.

References Cited

UNITED STATES PATENTS

| | | | |
|---|---|---|---|
| 1,017,532 | 2/1912 | Glenn | 242—86.4 |
| 1,048,863 | 12/1912 | Notman | 242—86.4 |
| 1,151,890 | 8/1915 | McConnell | 242—86 X |
| 1,420,056 | 6/1922 | Oliver | 242—77.2 |
| 1,469,818 | 10/1923 | Robertson | 242—74 |
| 1,752,048 | 3/1930 | Woodford. | |
| 1,946,764 | 2/1934 | Schaub | 242—77.2 |
| 3,030,047 | 4/1962 | Anderson et al. | 242—94 |
| 3,078,059 | 2/1963 | Johnson et al. | 242—86.3 |

FOREIGN PATENTS

| | | |
|---|---|---|
| 494,914 | 11/1938 | Great Britain. |
| 836,968 | 6/1960 | Great Britain. |

FRANK J. COHEN, *Primary Examiner.*

STANLEY N. GILREATH, *Examiner.*

W. S. BURDEN, *Assistant Examiner.*